US005607651A

United States Patent [19]

Thomas et al.

[11] Patent Number: 5,607,651

[45] Date of Patent: Mar. 4, 1997

[54] MULTIPLE PRODUCT DISPENSING SYSTEM INCLUDING DISPENSER FOR FORMING USE SOLUTION FROM SOLID CHEMICAL COMPOSITIONS

[75] Inventors: John E. Thomas, River Falls, Wis.; John E. McCall, W. St. Paul; Daniel K. Boche, Eagan; John J. Rolando, Woodbury; Terry J. Klos, Victoria, all of Minn.

[73] Assignee: Ecolab Inc., St. Paul, Minn.

[21] Appl. No.: 564,444

[22] Filed: Nov. 29, 1995

Related U.S. Application Data

[62] Division of Ser. No. 349,917, Dec. 6, 1994, Pat. No. 5,494,644.

[51] Int. Cl.[6] .......... B01D 11/02

[52] U.S. Cl. .......... 422/266; 137/268; 222/181.1; 222/185.1; 222/190; 422/261; 422/263; 422/278; 422/282

[58] Field of Search .......... 422/261, 263, 422/264, 266, 278, 281, 282, 902; 137/268; 222/181, 185, 190, 1, 16, 52, 61, 638, 129

[56] References Cited

U.S. PATENT DOCUMENTS

| | | | |
|---|---|---|---|
| 1,558,396 | 10/1925 | Roehrs . | |
| 2,006,085 | 6/1935 | Lehmkuhl | 141/7 |
| 2,540,431 | 2/1951 | Davis et al. | 222/117 |
| 2,704,241 | 3/1955 | Gannon | 23/267 |
| 2,766,767 | 10/1956 | Hodgens, Jr. | 422/261 X |
| 2,895,649 | 7/1959 | Dawson | 222/318 |
| 2,971,825 | 2/1961 | Kersh | 23/272.7 |
| 3,228,040 | 1/1966 | Currie | 4/226 |
| 3,419,360 | 12/1968 | Rak | 23/272.7 |
| 3,485,420 | 12/1969 | Lucas | 222/564 |
| 4,004,884 | 1/1977 | Zdrodowski | 23/259 |
| 4,048,757 | 9/1977 | Kubus et al. | 51/436 |
| 4,063,663 | 12/1977 | Larson et al. | 222/52 |
| 4,115,270 | 9/1978 | Phillips | 210/169 |
| 4,203,307 | 5/1980 | Obata et al. | 68/17 R |
| 4,250,910 | 2/1981 | King | 137/268 |
| 4,462,511 | 7/1984 | Fulmer et al. | 222/52 |

(List continued on next page.)

FOREIGN PATENT DOCUMENTS

| | | |
|---|---|---|
| 0314890 | 5/1989 | European Pat. Off. . |
| 9105512.1 | 7/1991 | Germany . |

OTHER PUBLICATIONS

DUCAP DISPENSER Operating Instructions, Catalog No. 910–221, DuBois Chemicals, Inc.

DUCAP DISPENSER Parts List, Catalog No. 910–229, DuBois Chemicals, Inc.

DuBois Capsule Dispenser, DuCap Potwash, DuCap Floor Cleaner, and DuCap Silver Soak literature, DuBois Chemicals, Inc.

*Primary Examiner*—Robert J. Warden
*Assistant Examiner*—Krisanne M. Thornton
*Attorney, Agent, or Firm*—Merchant, Gould, Smith, Edell, Welter & Schmidt, P.A.

[57] ABSTRACT

A multiple product dispensing system includes a plurality of use solution dispensers and a controller for selecting one of the dispensers according to a preset regimen, e.g., selecting different dispensers on different days of the week. Each dispenser dispenses a controlled concentration of use solution using a diluent delivery apparatus that delivers a diluent to form a liquid concentrate from a solid chemical composition, and to form make-up diluent for diluting the liquid concentrate and forming a use solution of controlled concentration. A foam reducer reduces the kinetic energy of the make-up diluent prior to mixing with the liquid concentrate to reduce foaming. An unskilled operator may operate the dispensing system to dispense a use solution of carefully controlled concentration, and the controller will automatically select the proper dispenser according to the preset regimen, without any additional input on the part of the operator. Therefore, the likelihood of operator error occurring is greatly reduced by the automatic selection of the proper dispenser and the control over use solution concentration.

23 Claims, 9 Drawing Sheets

U.S. PATENT DOCUMENTS

| | | | |
|---|---|---|---|
| 4,600,312 | 7/1986 | Scrivo | 366/159 |
| 4,690,305 | 9/1987 | Copeland | 222/52 |
| 4,695,433 | 9/1987 | Scrivo et al. | 422/112 |
| 4,826,661 | 5/1989 | Copeland et al. | 422/106 |
| 4,845,965 | 7/1989 | Copeland et al. | 68/17 R |
| 4,869,457 | 9/1989 | Ewerlöf | 251/6 |
| 4,909,047 | 3/1990 | Koeneman et al. | 62/389 |
| 4,964,185 | 10/1990 | Lehn | 8/158 |
| 4,995,418 | 2/1991 | Cervola | 137/268 |
| 5,007,559 | 4/1991 | Young | 222/1 |
| 5,262,132 | 11/1993 | Bricker et al. | 422/263 |
| 5,268,153 | 12/1993 | Muller | 422/263 |
| 5,308,579 | 5/1994 | Melon et al. | 422/28 |
| 5,342,587 | 8/1994 | Laughlin et al. | 422/266 |

MULTIPLE PRODUCT DISPENSING SYSTEM INCLUDING DISPENSER FOR FORMING USE SOLUTION FROM SOLID CHEMICAL COMPOSITIONS

This is a Divisional of application Ser. No. 08/349,917, filed Dec. 6, 1994, (now U.S. Pat. No. 5,494,644), which application are incorporated herein by reference.

FIELD OF THE INVENTION

The invention relates to devices for preparing and dispensing dilute use solutions of functional chemical compositions. More particularly, the invention relates to a device which provides a substantially constant proportion of a dilution stream and a liquid chemical concentrate formed from a solid chemical composition to form a chemical use solution therefrom. The invention also relates to a device for selectively dispensing a plurality of dilute use solutions according to a predetermined schedule.

BACKGROUND OF THE INVENTION

Dispensers for dilute liquid formulated chemical compositions are often designed to spray a stream of water onto a solid mass (e.g., a block or powder) of a concentrated composition for a limited period of time to produce a liquid chemical concentrate. This concentrate is then diluted with an appropriate amount of water to produce a use solution. The dispensers often require the user to manually control the dispensing time for the concentrate and the make-up water, which can result in widely varied use solutions due to operator error, inattentiveness, fluctuations in water pressure and temperature, etc.

Attempts have been made to incorporate timers and switches in an automated dispensing system. These systems typically control the delivery of the liquid concentrate and make-up water, etc., to a receiving vessel to form a use solution. While these devices can be very accurate, they can nonetheless produce potentially dangerous concentrated liquid solutions prior to the addition of the make-up water. Moreover, these devices tend to be relatively complex and expensive. Additional drawbacks of the present dispensers include complicated calculations required to produce varying amounts of the use of solution. Either the operator or the electronic control system of the dispenser must calculate the time or flow of the liquid concentrate and the make-up water to provide the use solution, which may result in excessive effort on the part of the operator or excessive cost for electronic controllers, and may introduce concentration errors in the use solution.

Dispensers incorporating a plurality of adjustable valves to provide a constant proportion of chemical concentrate and make-up water have also been used. These dispensers have a water supply valve as well as individual valves to control the water flow rate to a spray nozzle for formation of the liquid concentrate and the flow rate of the make-up water. While these dispensers allow for variations of use solution concentration, they require adjustment by a skilled operator, and are difficult to maintain at stable concentration levels over their lifetime. Further, the use solution concentrate can be adjusted by unauthorized personnel without quick detection.

The solid chemical dispenser art has made several advances over the years. However, present designs require skilled operator or expensive electronic controls to provide accurate delivery of use solutions. In addition, present systems can provide an initial charge of highly concentrated and potentially dangerous liquid concentrate solutions prior to dilution with make-up water. Present constant ratio systems require careful calibration of valve settings to provide desired concentrations.

Therefore, in view of the deficiencies in prior art dispensing systems, a simple yet versatile dispenser is needed which is capable of providing use solutions at varying controlled concentrations and at any desired volume. More particularly, a dispenser is needed which can provide a use solution wherein the concentrate and make-up water are delivered simultaneously at a constant ratio, and which ratio is simply and accurately altered by an unskilled operator.

Dispensing systems have also been developed which are designed to dispense a plurality of use solutions, whereby different solutions may be selectively dispensed by an operator. For example, for cleaning, different use solutions may be needed for different cleaning tasks, or for following a cleaning schedule or regimen.

However, dispensing solutions for different tasks or regimens requires an operator to select the proper use solutions to be dispensed at the proper times. An operator may forget the place in a particular cleaning schedule, particularly when many operators are relied upon to carry out a particular schedule. Others may simply choose not to follow the schedule. In some instances, deviations can result in less than optimal cleaning results.

Therefore, there is also a need for a dispensing system which can facilitate dispensing of a plurality of use solutions such as cleaning solutions for different tasks and/or for following a preferred schedule. In particular, there is a need for a dispensing system which can control the particular use solutions dispensed by the system for different tasks or schedules, to minimize the possibility of operator error when using the system.

SUMMARY OF THE INVENTION

The invention addresses these and other problems associated with the prior art in providing a dispensing system which offers controlled dispensing of different carefully controlled diluted use solutions according to a preset regimen. Operator error, whether through incorrect control over use solution concentration, or through selection of incorrect use solutions for a particular dispensing regimen or schedule, is minimized.

Preferred dispensing systems may include a use solution dispenser for dispensing controlled concentrations of use solutions from solid chemical concentrate compositions. A diluent delivery apparatus delivers a diluent to form a liquid concentrate from a solid chemical composition, and to form make-up diluent for diluting the liquid concentrate and forming a use solution of controlled concentration. By controlling the respective flow rates of the diluent forming the liquid concentrate and the make-up diluent, the concentration of the resulting use solution may be carefully controlled. A foam reducer, disposed in fluid communication with the make-up diluent, reduces the kinetic energy of the diluent prior to mixing with the liquid concentrate to thereby reduce foaming.

Therefore, in accordance with one aspect of the invention, a dispenser is provided for dispensing a use solution comprising a solid chemical composition and a diluent. The dispenser includes a manifold having an inlet port and first and second outlet ports, the inlet port for receiving a flow of diluent; mixing means, in fluid communication with the first outlet port of the manifold, for mixing the diluent with a solid chemical composition to form a liquid concentrate, the mixing means including a first flow restrictor for restricting the flow of diluent through the first outlet port, and a first outlet tube for dispensing the liquid concentrate; diluting means, in fluid communication with the second outlet port of the manifold, for diluting the liquid concentrate with diluent to form a use solution, the diluting means including a second flow restrictor for restricting the flow of diluent through the second outlet port, and a second outlet tube in fluid communication with the second outlet port and disposed within the first outlet tube; whereby the concentration of the use solution is related to the respective flow rates through the first and second outlet ports; and foam reducing means, coupled to the second outlet tube, for decreasing the kinetic energy of the diluent from the second outlet port prior to diluting the liquid concentrate.

In accordance with a further aspect of the invention, a method of dispensing a use solution comprising a solid chemical composition and a diluent is provided, including the steps of directing a flow of diluent to first and second outlet ports of a manifold; mixing the diluent from the first outlet port with a solid chemical composition to form a liquid concentrate; decreasing the kinetic energy of the diluent from the second outlet port using a foam reducer; diluting the liquid concentrate with diluent from the second outlet port to form a use solution; and regulating the respective flow rates through the first and second outlet ports to control the concentration of the use solution.

Preferred dispensing systems may also include a plurality of dispensers and a controller for controlling the dispensing of use solutions to follow a preset regimen. An unskilled operator may operate the dispensing system to dispense a use solution, and the controller will automatically select the proper dispenser according to the preset regimen, without any additional input on the part of the operator. Therefore, the likelihood of operator error occurring is greatly reduced by the automatic selection of the proper dispenser by the preferred controllers.

Therefore, in accordance with another aspect of the invention, a dispensing system is provided for dispensing a plurality of use solutions. The dispensing system includes first and second dispensers for dispensing first and second use solutions, respectively; and a controller, coupled to the first and second dispensers, the controller including selecting means for selecting one of the dispensers according to a preset regimen, and dispensing means for dispensing the use solution from the selected dispenser.

According to a further aspect of the invention, a method is provided for dispensing a plurality of solutions in a dispensing system of the type including first and second dispensers for respectively dispensing first and second use solutions. The method includes the steps of automatically selecting one of the dispensers according to a preset regimen; and dispensing a use solution from the selected dispenser in response to an operator request.

These and other advantages and features, which characterize the invention, are set forth in the claims annexed hereto and forming a further part hereof. However, for a better understanding of the invention, and the advantages and objective attained by its use, reference should be made to the Drawing, and to the accompanying descriptive matter, in which there is described a preferred embodiment of the invention.

DETAILED DESCRIPTION OF THE PREFERRED EMBODIMENT

Figure 1:
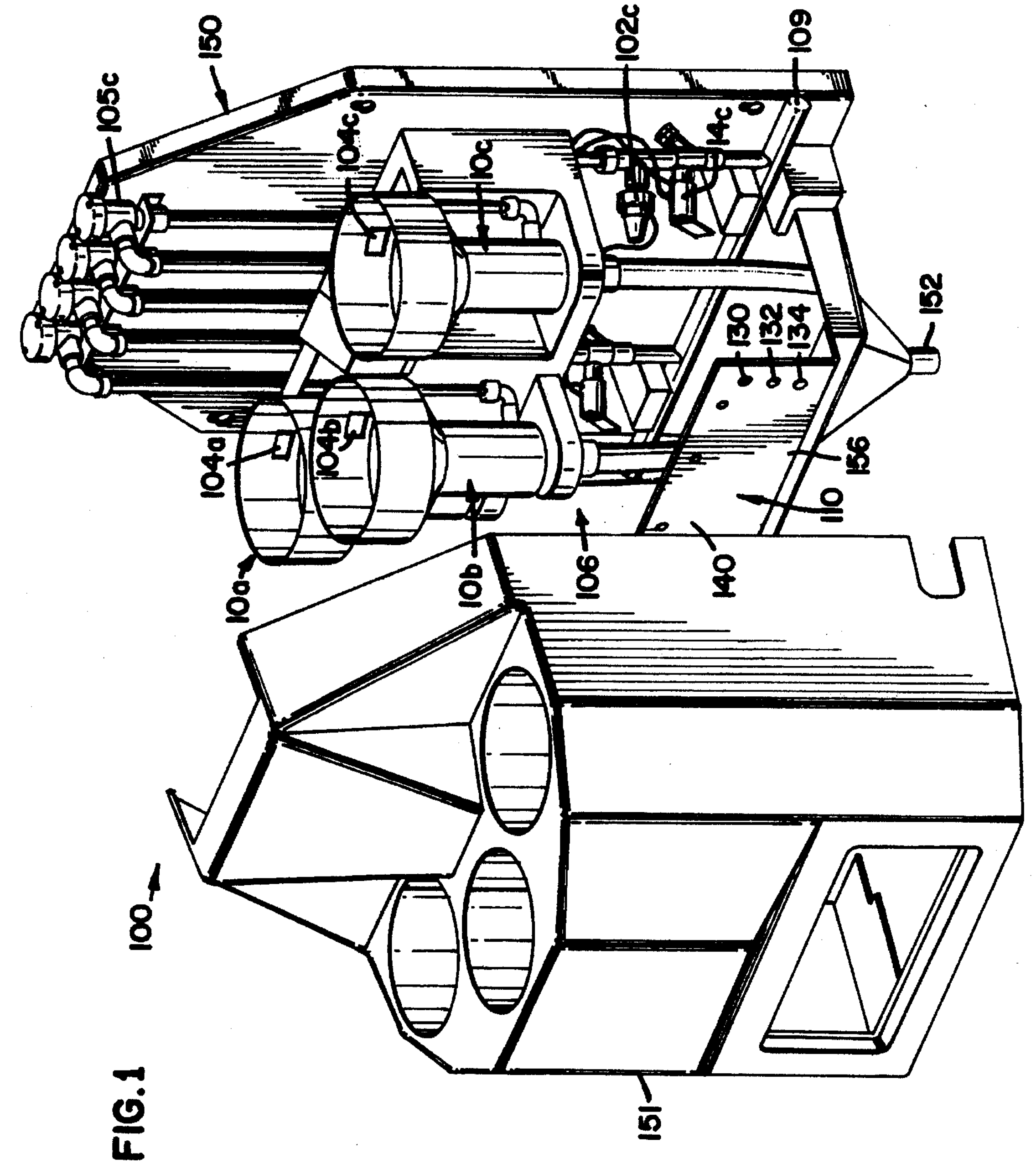
FIG. 1 is a partially exploded perspective of a dispensing system consistent with the invention.

Turning to the Drawing, wherein like parts are denoted by like numerals throughout the several views, FIG. 1 shows a preferred dispensing system 100 consistent with the principles of the invention, for controllably dispensing a plurality of use solutions on demand.

Dispensing system 100 preferably includes a plurality of individual use solution dispensers 10*a*, 10*b*, 10*c*, and a fresh water dispenser 106, mounted within a housing 150 and controlled by a control system 110. Greater or fewer dispensers may be incorporated on dispensing system 100. Each dispenser is preferably connected to a common diluent inlet 109 through a solenoid valve, pressure switch and vacuum breaker (e.g., valve 14*c*, switch 102*c* and breaker 105*c* for dispenser 10*c*). The outputs of the dispensers are in fluid communication with a common outlet 152, which is preferably connected to a tube or other member to conduct fluid to a desired point of use such as a mop bucket.

Housing 150 includes a cover 151 for limiting access to the internal components of the dispensing system. A user interface panel 156, including displays 140 and push buttons 130, 132, 134, is used by an operator to receive status information and to control the operation of dispensing system 100.

Use Solution Dispensers

Figure 2:
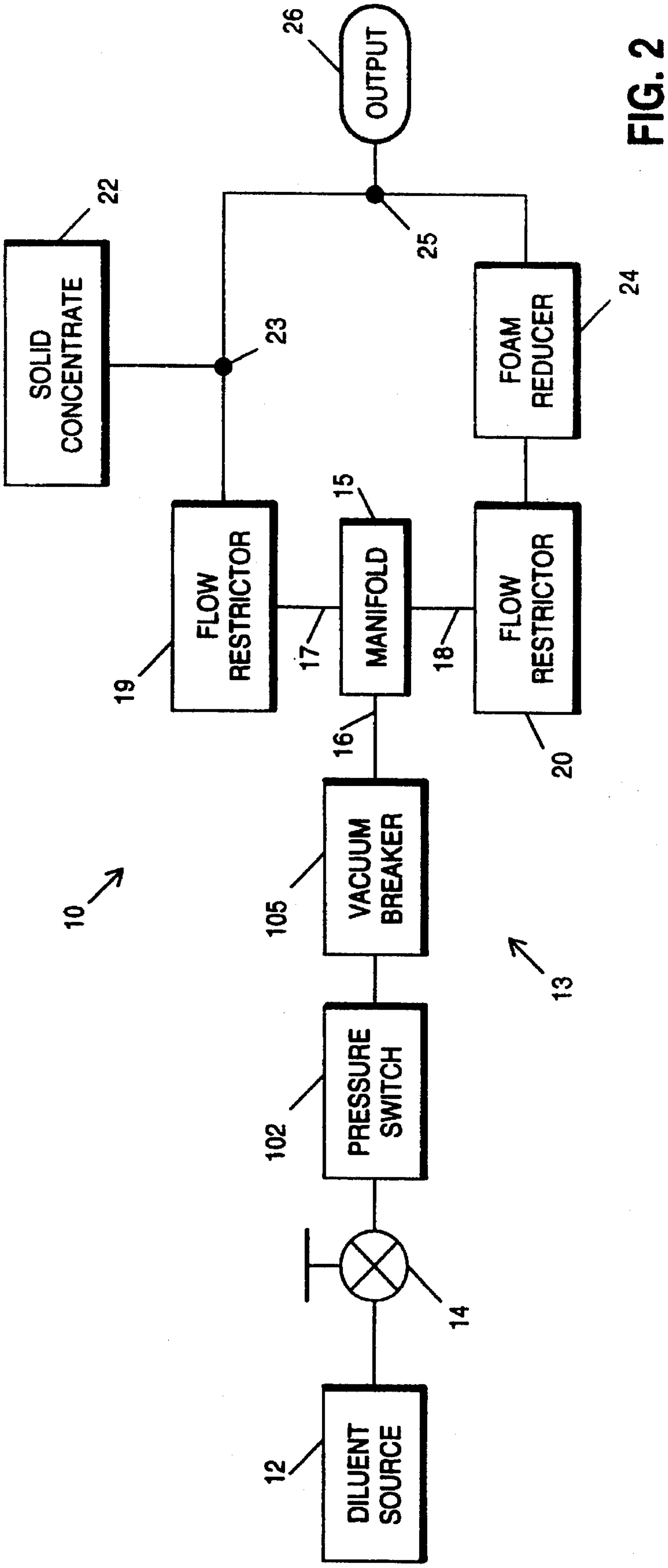
FIG. 2 is a schematic representation of a dispenser used in the dispensing system of FIG. 1.

Use solution dispensers 10*a*, 10*b* and 10*c* preferably dispense a diluted use solution from a solid chemical functional composition. For example, FIG. 2 shows a schematic representation of the operation of one of the preferred dispensers (designated generically as 10). Dispenser 10 is preferably adapted to receive a diluent such as water from a diluent source 12, whereby the dispenser forms a use solution from the diluent and a solid concentrated chemical composition 22 and provides the use solution at output 26.

While dispenser 10 is preferably for use in dispensing system 100, it will nonetheless be appreciated that dispenser 10 may also be used in a stand-alone application, or in other dispensing systems, consistent with the invention.

Diluent source 12 may be a source of pressurized water at a predetermined temperature and pressure. It may be preferable to include means for controlling and/or monitoring the temperature and/or pressure of the water, as the solubility of the solid concentrate and the concentration levels provided by dispenser 10 will vary depending upon the temperature and pressure of the incoming diluent. Preferably, diluent source 12 provides a source of water that is between about 30 and 70 psi, with a flow rate between about 5 and 10 gallons/minute, more preferably between about 3 and 4 gallons/minute. The temperature of the water is preferably up to 180 degrees Fahrenheit, more preferably between about 120 and 140 degrees Fahrenheit. Other diluents may also be used consistent with the invention.

Solid concentrate or chemical composition 22 is preferably provided in a cast solid block form, whereby a liquid or aqueous concentrate may be formed therefrom by directing a high pressure stream of diluent onto the block. An example of such a system is disclosed in U.S. Pat. No. 4,690,305 to Copeland. Alternatively, solid concentrate 22 may be provided in powder form and mixed with diluent to form the liquid concentrate. An example of this type of system is disclosed in U.S. Pat. No. 4,063,663 to Larson et al. Both of these references are incorporated by reference herein. Other systems for forming concentrate solutions from solid chemical compositions are also known in the art.

Various chemical compositions may be used for solid concentrate 22, such as different cleaners, e.g., for multipurpose use, disinfecting or sanitizing, cleaning floors, other specialized applications, etc. However, while the preferred application for the invention is in dispensing cleaning solutions, it will be appreciated that other use solutions for other applications may also be dispensed consistent with the invention.

A diluent delivery system or apparatus 13 delivers the diluent (preferably water) from diluent source 12 for forming a use solution with solid concentrate 22. Diluent delivery system 13 includes a control valve 14 which controls the entrance of water into the dispenser 10. Its action also controls the ultimate flow of the use solution to output 26 of dispenser 10. Downstream and in fluid communication with the control valve 14, there is a manifold 15 having an inlet port 16 and first and second outlet ports 17 and 18. In the preferred embodiment, valve 14 is the only control mechanism that must be activated to dispense use solution from the dispenser. It will be appreciated, however, that other control valves and mechanisms (e.g., check valves, solenoid valves, diverter valves, etc.) may also be incorporated to control the flow of diluent and other solutions through dispenser 10.

A pressure switch 102 and a vacuum breaker 105 may also be incorporated into dispenser 10 between valve 14 and manifold 15. The pressure switch may provide a signal indicating to the control system when flow is established to the manifold. The vacuum breaker may be required to comply with building codes to prevent the backflow of use solution into the source of diluent. It will be appreciated that neither of these devices are necessary for the proper operation of dispenser 10, particularly in stand-alone applications.

Manifold 15 provides a separation of water flow from inlet port 16 to outlet ports 17 and 18. First outlet port 17 conducts fluid from inlet port 16 toward a first flow restrictor 19, and second outlet port 18 conducts fluid from inlet port 16 to a second flow restrictor 20 as make-up diluent or water. In other words, first outlet port 17 provides water to solid concentrate 22 to form the liquid concentrate at junction 23, and second outlet port 18 provides the make-up water to dilute the liquid concentrate to form a use solution at junction 25. Thus configured, dispenser 10 can deliver a controlled concentration of a dilute use solution of chemical composition directly to output 26 with the operation of the single valve 14.

In a preferred embodiment, second flow restrictor 20 of diluent delivery system 13 includes a metering orifice in fluid communication with second outlet port 18. In addition, first flow restrictor 19 includes a spray nozzle for directing a high pressure stream of water against the solid block for forming the liquid concentrate solution. The relationship between the openings in the metering orifice and the spray nozzle provides the ratio between the flow rates of the liquid concentrate and make-up water, which ultimately controls the concentration of the use solution.

It has been found that some liquid concentrate solutions may produce foam when impinged by a stream of make-up water having a substantially greater velocity. Thus, a suitable foam reducer 24 may also be incorporated in dispenser 10 to reduce the kinetic energy of the make-up water before mixing with the liquid concentrate solution.

Figure 3:
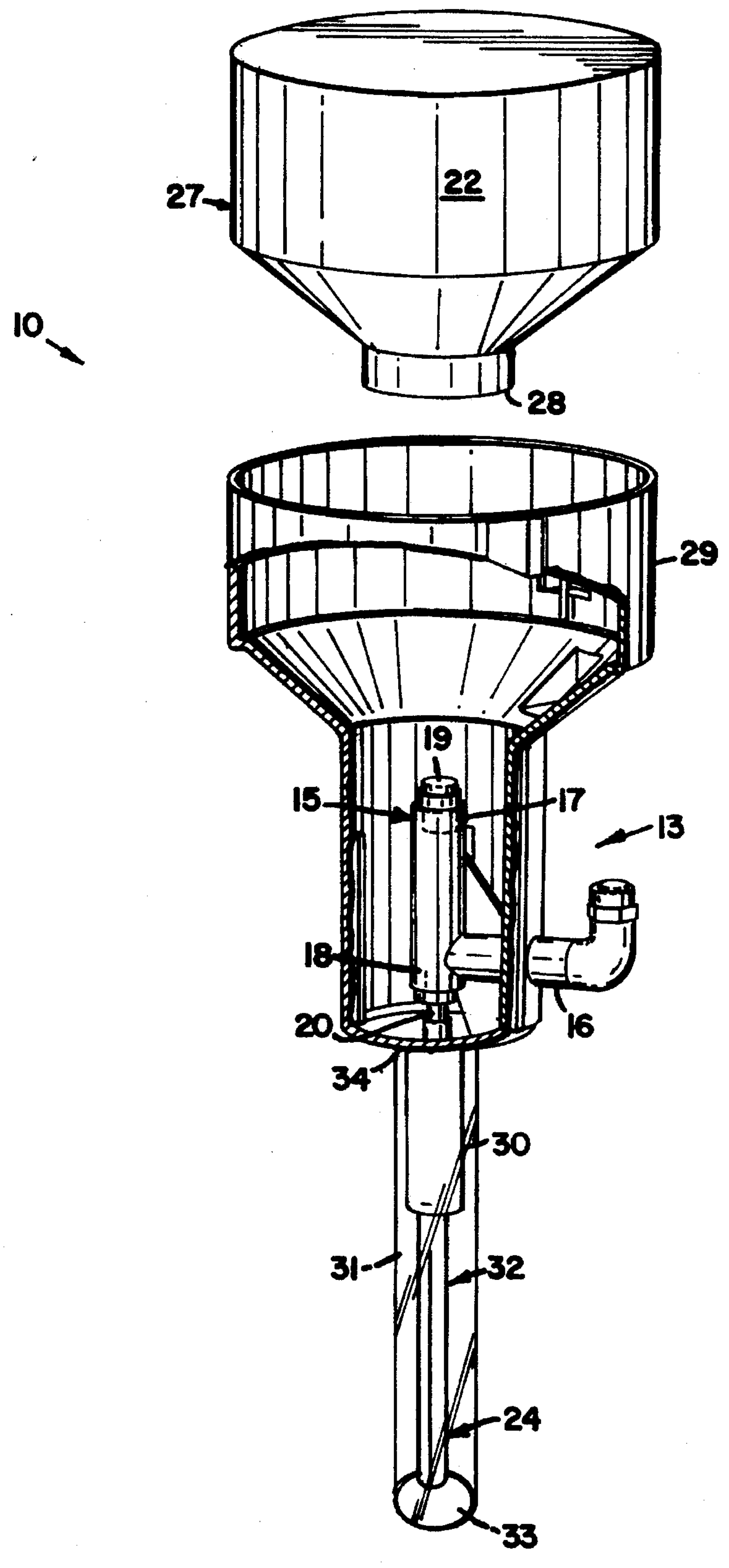
FIG. 3 is a perspective view of one of the dispensers of FIG. 1.

FIG. 3 shows the preferred structure of dispenser 10 for dispensing a solid block product concentrate 22 that is stored in a container 27 having a downwardly-directed opening 28. Dispenser 10 includes a cup-shaped member 29 which supports solid concentrate container 27 and collects the liquid chemical concentrate produced therefrom. An opening 34 is provided at the bottommost portion of member 29 for dispensing the liquid chemical concentrate.

Manifold 15 of diluent delivery system 13 is preferably fully disposed within the bottom portion of member 29, with inlet port 16 extending through a wall of member 29, with first outlet port 17 oriented generally upward in the direction of opening 28 in container 27, and with second outlet port 18 oriented generally over opening 34. In this configuration, the effects of gravity are used to allow the liquid concentrate solution and the make-up water to drain down into a common collection tube 31. However, it will be appreciated that the inlet and outlet ports on manifold 15 may be oriented in any direction with respect to each other or with respect to the direction of gravity. Moreover, different designs of enclosures or containers may be used to house the manifold and the solid concentrate.

A mixing means, preferably including a spray nozzle 19 forming a first flow restrictor, is preferably in fluid communication with first outlet port 17 for directing a high pressure stream of water into opening 28 of container 27 to dissolve solid concentrate 22 and form a liquid concentrate solution of controlled concentration therefrom. Preferably, nozzle 19 is disposed within opening 28 when container 27 is in its operational position on member 29.

Nozzle 19 may provide varying spray patterns suitable for the particular solid concentrate used. For example, different spray patterns may be used depending upon the size and shape of a solid block, or, if a solid powder is used, the manner of dispensing the powder into member 29. Spray nozzle 19 preferably has an output orifice that is between about 0.03125 (1/32) and 0.140625 (9/64) inches, more preferably about 0.0625 (1/16) to 0.09375 (3/32) inches, in diameter.

Nozzle 19 may be oriented in a fixed position with respect to solid concentrate container 27. Alternatively, the position of nozzle 19 may be manually adjustable with respect to the container to vary output concentrations for products of differing solubility. Nozzle 19 may also be automatically movable to maintain a constant separation from the nozzle to the surface of the solid concentrate as the concentrate is systematically dissolved. Other structures, such as screens and other mechanisms for housing a source of solid concentrate may also be used.

The liquid concentrate solution formed by the diluent from spray nozzle 19 and solid concentrate 22 drains through opening 34 in member 29. Member 29 includes a flange 30 onto which a first collection tube 31 is mounted.

Second outlet port 18 is in fluid communication with a diluting means which includes a metering tip 20 forming a second flow restrictor. Make-up water is conveyed through outlet port 18 and metering tip 20 into a second collection tube 32 which outlets into first collection tube 31. The make-up water then mixes with the liquid concentrate solution at portion 33 of tube 31 to dilute the liquid concentrate and form the final use solution.

Collection tubes 31 and 32 are preferably formed of a clear flexible resilient material such as PVC. Other materials, such as EVD, polypropylene or polyethylene, etc. may also be used consistent with the invention. Each tube should be constructed to have a sufficient inner diameter to accommodate the flow of fluids through the tubes. Tube 31 preferably has a diameter between about 0.75 and 1.00 inches, and tube 32 preferably has a diameter between about 0.25 and 0.375 inches. Other sizes and types of materials may also be used.

As shown in FIG. 3, second collection tube 32 may be concentric with first collection tube 31. Alternatively, the liquid concentrate and the make-up water may be delivered through a single tube, or may be delivered through completely separate apertures from dispenser 10. Consequently, the diluting means may encompass different structures for transmitting and mixing the liquid concentrate and make-up diluent.

Generally, the make-up water provided through metering orifice 20 and second collection tube 32 has greater kinetic energy than the liquid concentrate provided through opening 34 and first collection tube 31. Consequently, for some applications, a foam reducer 24 is preferably employed in the diluting means to reduce the amount of foam generated by the flow of make-up water.

Foam reduction is preferably accomplished by decreasing the kinetic energy of the make-up water, which typically may be performed by decreasing the velocity or the pressure of the water. The velocity of the water may be decreased, for example, by causing the stream to contact the walls of tube 32. The make-up water may be directed through baffles, or it may be conducted through a flexible resilient section. Various obstructions such as a pin disposed within the tube or a bend formed in the tube may also be used.

Figure 4:
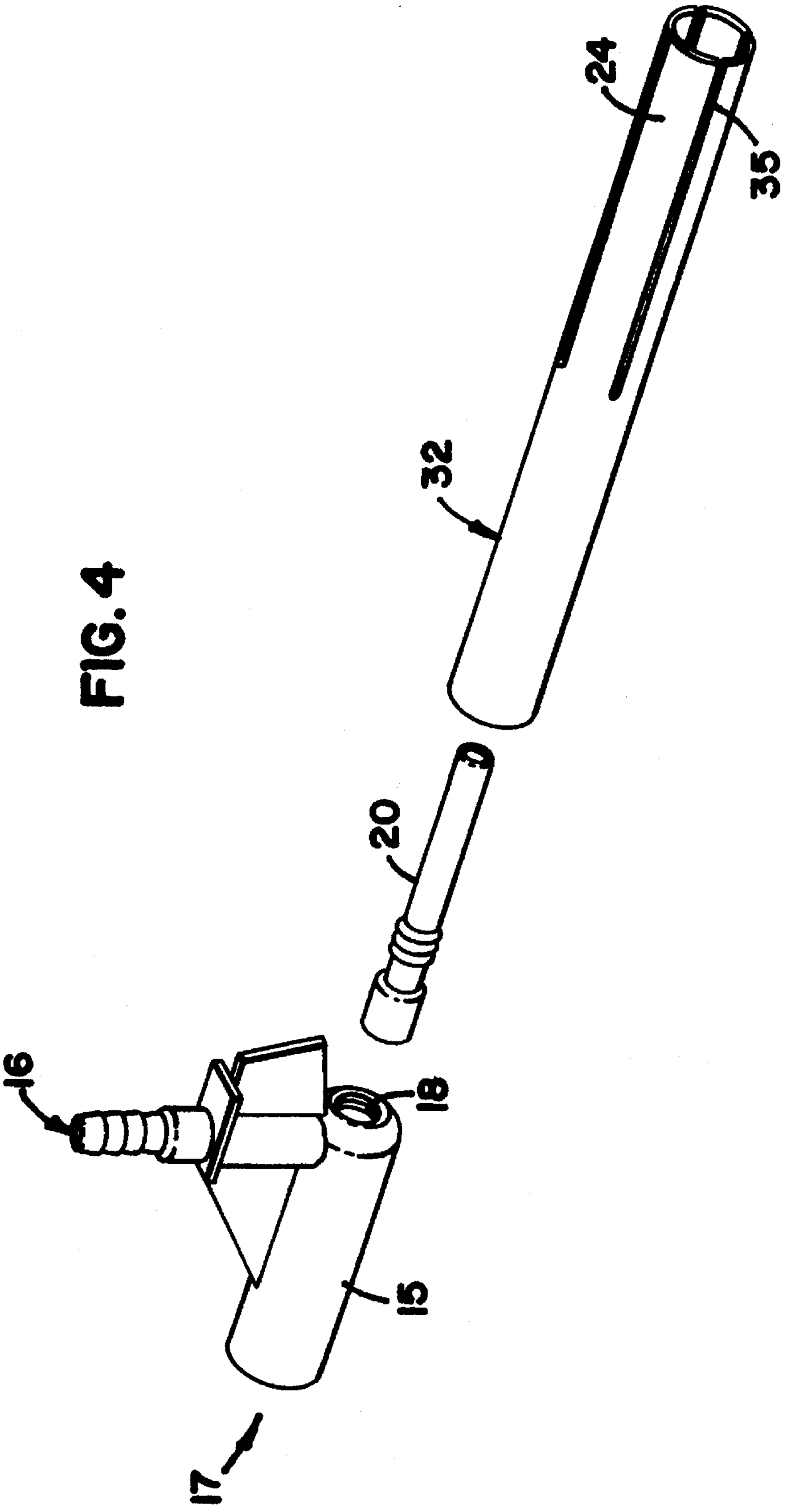
FIG. 4 is an exploded perspective view of a portion of the diluent delivery system for the dispenser of FIG. 2.

Preferably, the foam reducer 24 is a portion of collection tube 32 which has been slit longitudinally with a plurality of slits 35, which is best shown in FIG. 4. The slits may be bent or flared as necessary to provide the appropriate obstruction to the flow of make-up water through the tube. Preferably four slits 35 are formed in tube 32, although greater or fewer slits may also be formed consistent with the invention.

After the use solution is formed from the make-up water passing through tube 32 and foam reducer 24 (if used) and the liquid concentrate passing through tube 31, the use solution is preferably delivered to an appropriate output 26, which may be a bus pan, or it may be a container such as a bottle, bucket, sink, autoscrubber, mop bucket, etc. Preferably output 26 is a mop bucket. For example, in dispensing system 100, the use solution would exit tube 31 into common outlet 152 (FIG. 1).

Use Solution Concentration Control

Control over the concentration of the use solution is provided by controlling the respective flow rates to the first and second outlet ports 17 and 18. In the preferred embodiment, spray nozzle 19 controls the flow rate through first outlet port 17, and metering orifice 20 controls the flow rate through second outlet port 18.

As shown in FIG. 4, metering orifice 20 is preferably removably connected to second outlet port 18 of manifold 15. Preferably, metering orifice 20 threadably engages a tapped threaded portion of second outlet port 18. This allows metering orifice 20 to be removed and replaced with another metering orifice if desired. Consequently, differently sized metering orifices may be individually inserted into second outlet port 18 to provide a wide variety of use solution concentrations and/or to provide a desired concentration of use solution over a wide variety of operating conditions including water pressure, temperature, etc. Preferably the various sized metering orifices 20 are color-coded to assist an operator in selecting the correct size of metering orifice for a particular application.

The restriction in flow through second outlet port 18 may be performed by devices other than removable metering tips. For example, the restriction in flow may be provided by a narrowed opening integrally formed in manifold 15, or by a valve such as a needle valve.

The output orifice in metering orifice 20 is preferably between about 0.050 and 0.375 inches in diameter, more preferably between about 0.100 and 0.200 inches. With the aforementioned ranges of spray nozzle orifice dimensions, the preferred dispenser 10 is capable of providing a flow rate of make-up water which is between about 70 and 90 percent, more preferably about 88 to 95 percent, of the flow rate of liquid concentrate solution. Typical concentrations of liquid concentrate, e.g., at 155° F., are between about 6000 to 16,000 ppm, with concentrations of use solutions of between about 640 to 5000 ppm, are obtainable with dispenser 10.

Returning to FIG. 3, metering orifices 20 are preferably removed and replaced through a relatively simple procedure. First collection tube 31 is disengaged from flange 30, then metering orifice 20 is unscrewed from manifold 15. Second collection tube 32 is removed from metering orifice 20 and placed on a different metering orifice. The new metering orifice is then screwed into manifold 15, and first collection tube 31 is slid over the metering orifice and back on to flange 30.

As discussed above, the ratio of water delivered through the spray nozzle 19 and metering orifice 20 controls the concentration of cleaning composition in the use solution. However, the concentration also depends on the supply water temperature pressure and the solid concentrate used. Therefore, a table correlating water temperature, water pressure, solid composition, spray nozzle dimensions, spray patterns and metering orifice size can be prepared. This data can be generated manually by altering individual variables and measuring the resulting use solution concentration. Alternatively, a test set-up may be devised to automatically generate the required data, e.g., using a conductivity cell to monitor use solution concentration for different sets of variables.

To generate a table manually, one method may be to select a suitable solid concentrate, water pressure and water temperature, and set up the dispenser with a desired metering orifice size. Then, the dispenser is run for 2–3 minutes (to simulate the normal fill of a mop bucket). Subsequent fill cycles are performed about every 90 minutes (to simulate typical use conditions) until the entire solid concentrate product is used up. The concentration of the resulting solution is periodically calculated after each fill cycle by titrating the use solution to provide a graph of the output of the dispenser. The above process may also be performed for other metering orifice sizes using the same product, water pressure and temperature variables, to generate a suitable table showing the relationship between use solution concentrations and metering orifice size for certain products at certain controlled operating conditions (e.g., water temperature and pressure).

For example, the aforementioned test procedure was performed for several products A, B and C on a preferred dispenser with a nozzle diameter of 0.09375, a water pressure of 40 PSI, and water temperatures of 125° F. and 155° F.

Product A was an acidic cleaner provided in solid block form and comprising an organic or inorganic acid (or mixtures thereof), a nonionic surfactant or mixtures thereof, optionally an anionic surfactant, a fragrance, a dye, and packaged in a solid product format and container. Product B was a neutral cleaner provided in solid block form and comprising a nonionic surfactant or mixtures thereof, optionally an anionic surfactant, a fragrance, a dye, and packaged in a solid product format and container. Product C was an alkaline cleaner provided in solid block form and comprising an alkaline source such as an alkali metal hydroxide or silicate, ammonium compound, etc., or amine compound, a nonionic surfactant or mixtures thereof, optionally an anionic surfactant, a fragrance, a dye, and packaged in a solid product format and container. Tables I and II show the product concentrations resulting from several different metering tip orifice diameters, at 155° F. and 125° F., respectively.

TABLE I

40 PSI Water Pressure/0.09375 in. Nozzle Size/155° F. Water Temperature

| Metering Orifice | | Use Solution Concentration (ppm) | | |
|---|---|---|---|---|
| Number | Diameter (in.) | Product A | Product B | Product C |
| 1 | 0.2031 | 2590 | 1900 | 2880 |
| 2 | 0.1874 | 2780 | 2040 | 3110 |
| 3 | 0.1718 | 3020 | 2170 | 3350 |
| 4 | 0.1562 | 3310 | 2310 | 3680 |
| 5 | 0.1406 | 3705 | 2450 | 4080 |
| 6 | 0.1250 | 4190 | 2600 | 4585 |
| 7 | 0.1094 | 4750 | 2750 | 5180 |

TABLE II

40 PSI Water Pressure/0.9375 in. Nozzle Size/125° F. Water Temperature

| Metering Orifice | | Use Solution Concentration (ppm) | | |
|---|---|---|---|---|
| Number | Diameter (in.) | Product A | Product B | Product C |
| 1 | 0.2031 | 1805 | 900 | 1145 |
| 2 | 0.1874 | 1950 | 970 | 1255 |
| 3 | 0.1718 | 2097 | 1045 | 1385 |
| 4 | 0.1562 | 2295 | 1150 | 1580 |
| 5 | 0.1406 | 2550 | 1275 | 1830 |
| 6 | 0.1250 | 2875 | 1420 | 2150 |
| 7 | 0.1094 | 3242 | 1588 | 2546 |

Figure 5B:
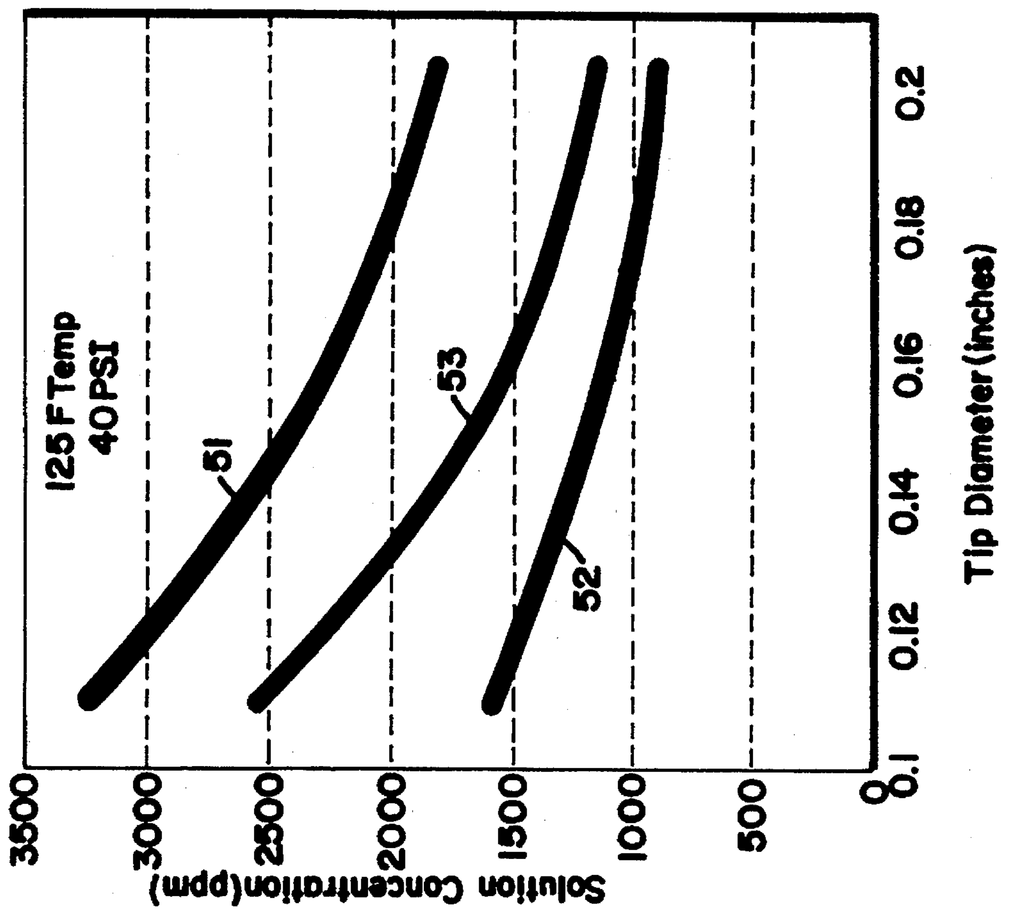
FIGS. 5A and 5B are graphs showing representative relationships between outlet orifice size and use solution concentration at different temperatures for the dispenser of FIG. 2.
Figure 5A:
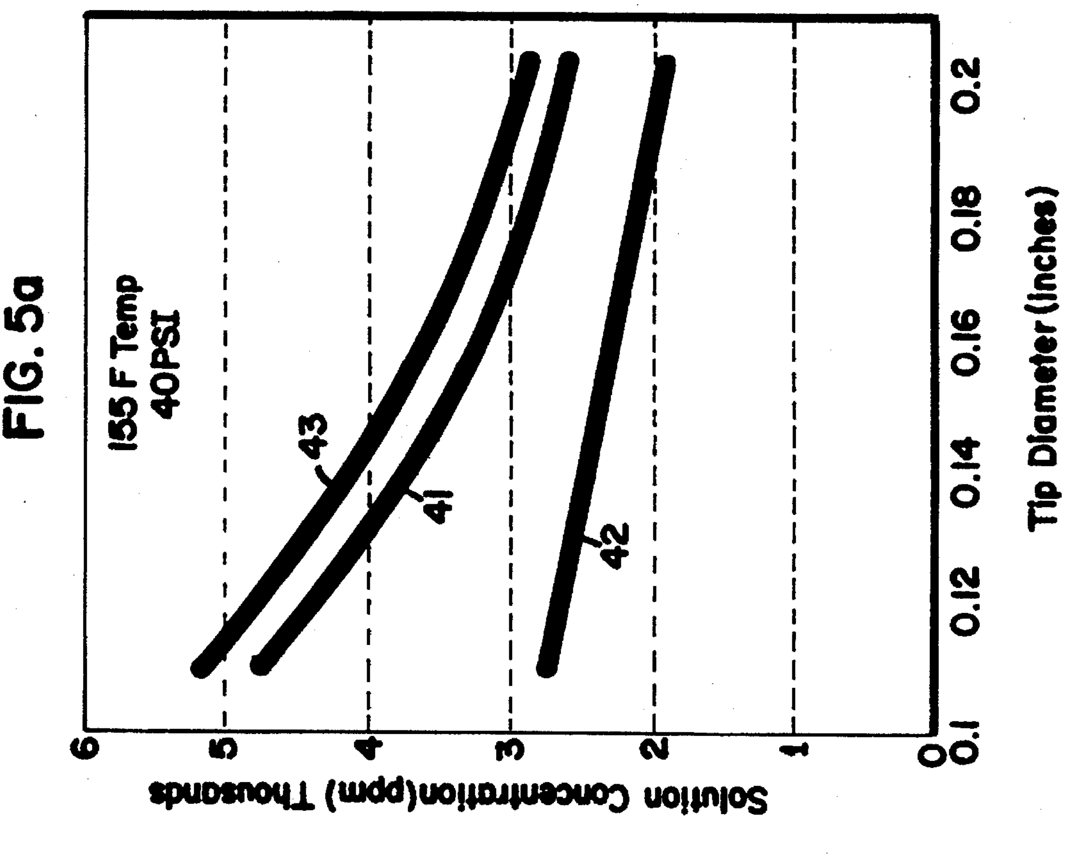

FIGS. 5A and 5B are graphs showing the data provided in Tables I and II, respectively. Lines 41 and 51 show the concentration/orifice diameter relationship for Product A. Lines 42 and 52 show the same relationship for Product B. Lines 43 and 53 show the same relationship for Product C.

Similar graphs to those shown in FIGS. 5A and 5B may be constructed for different dispensers, nozzle sizes, water pressures, water temperatures, and solid concentrate products as desired. Consequently, when a particular use solution concentration of a product is desired, an operator knowing the water temperature and pressure can select a suitable metering orifice for a particular dispenser by simply consulting an appropriate graph and changing out the metering orifice accordingly.

The preferred dispenser 10 therefore generally operates by directing a flow of diluent to the first and second outlet ports of the manifold, mixing the diluent from the first outlet port with the solid chemical composition to form the liquid concentrate, and diluting the liquid concentrate with diluent from the second outlet port to form a use solution, all the while regulating the respective flow rates through the first and second outlet ports to control the concentration of the use solution. It will be appreciated that various modifications to the preferred dispenser may be made without departing from the spirit and scope of the invention.

Cleaning Regimens

Returning to FIG. 1, control system 110 is used to control the activation of use solution dispensers 10*a*, 10*b*, 10*c* and fresh water dispenser 106. In the preferred embodiment, dispenser 10*a* dispenses an alkaline (base) cleaning solution, dispenser 10*b* dispenses a neutral pH cleaning solution, and dispenser 10*c* dispenses an acidic cleaning solution. Control system 110 may be programmed to dispense different solutions in response to an operator's selection on a user interface panel 156. Moreover, control system 110 may be programmed to dispense particular solutions at different times for implementing a preferred cleaning schedule or regimen.

For example, it has been found that in the food service industry and other similar applications, specific cleaning regimens or schedules may be adopted for tile floor cleaning. The regimens, using combinations of acidic, alkaline and neutral cleaning solutions, are discussed in U.S. patent application Ser. No. 08/382,293 filed by John J. Rolando et al. on Feb. 1, 1995, and entitled "A Floor Cleaning Method and Product Sequencing".

Tile and grout surfaces may be more responsive to different cleaning solutions. For example, tile surfaces, which may be exposed to grease, food and other fatty deposits on a daily basis, may be more sensitive to alkaline cleaning solutions. On the other hand, grout, which may have more complex deposits, may be more sensitive to acidic cleaning solutions. The types of soil (e.g., due to the different types of food served and the manners of preparation) and the hardness of the water at the establishment, may also vary the responsiveness of the floor surfaces.

Specific cleaning regimens may be designed to optimize the cleaning of tile floors. Preferred cleaning schedules may be developed to follow a weekly cycle, with different solutions used on different days. Alternatively particular solutions may be selected based upon a monthly, weekly, hourly, etc., basis, or even based upon a per use/per mop bucket basis, or by the quantity dispensed. Moreover, different regimens may be adapted for cleaning other surfaces besides tile floors.

Control System

The preferred dispensing control system 110 facilitates following a preferred cleaning regimen for a particular application by controlling which use solutions are dispensed by the system for particular tasks and/or at different times. An on-board clock maintains the current day and time, whereby different solutions may be controllably dispensed at different times without requiring explicit control by an operator. Consequently, the possibility of operator error or deviation from a preferred cleaning regimen may be minimized.

Figure 6:
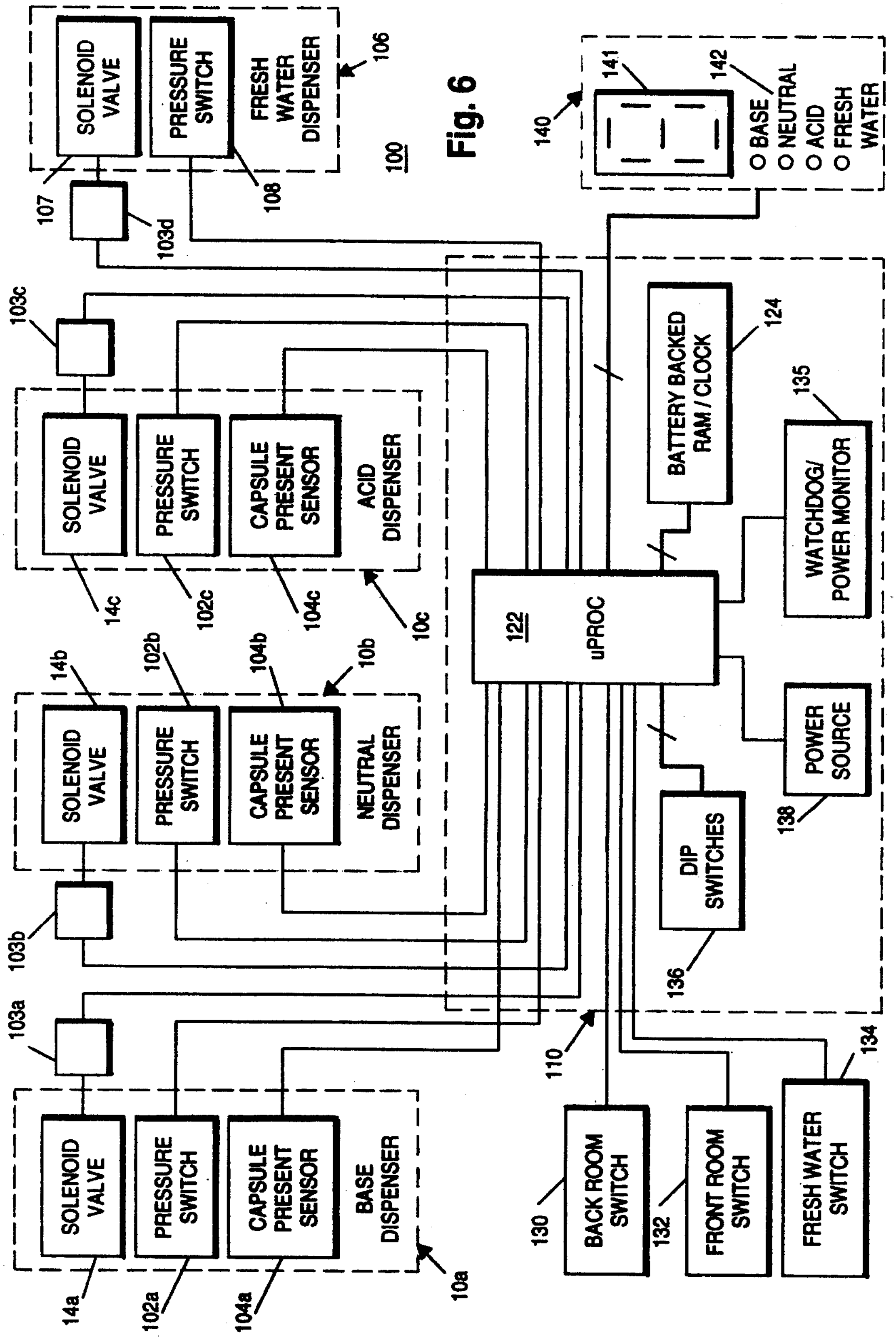
FIG. 6 is a schematic representation of the control system of the dispensing system of FIG. 1.
Figure 7A:
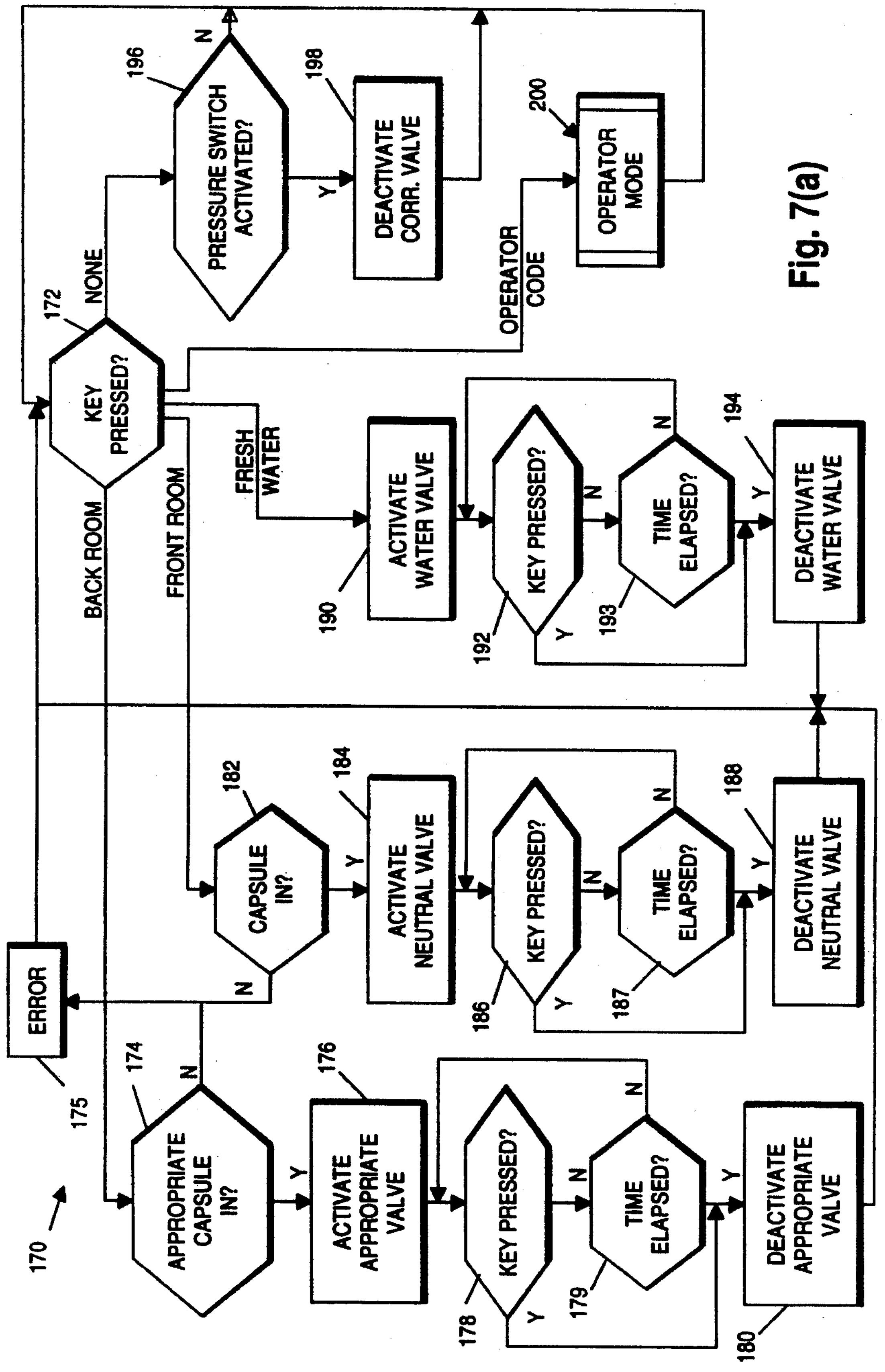
FIGS. 7(*a*), 7(*b*), 7(*c*) and 7(*d*) are flowcharts showing a preferred program flow for the control system of FIG. 6.
Figure 7B:
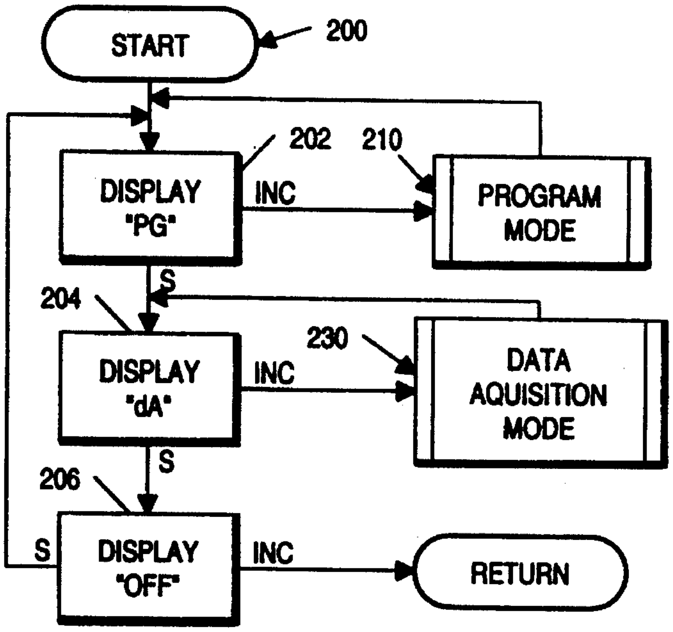
Figure 7C:
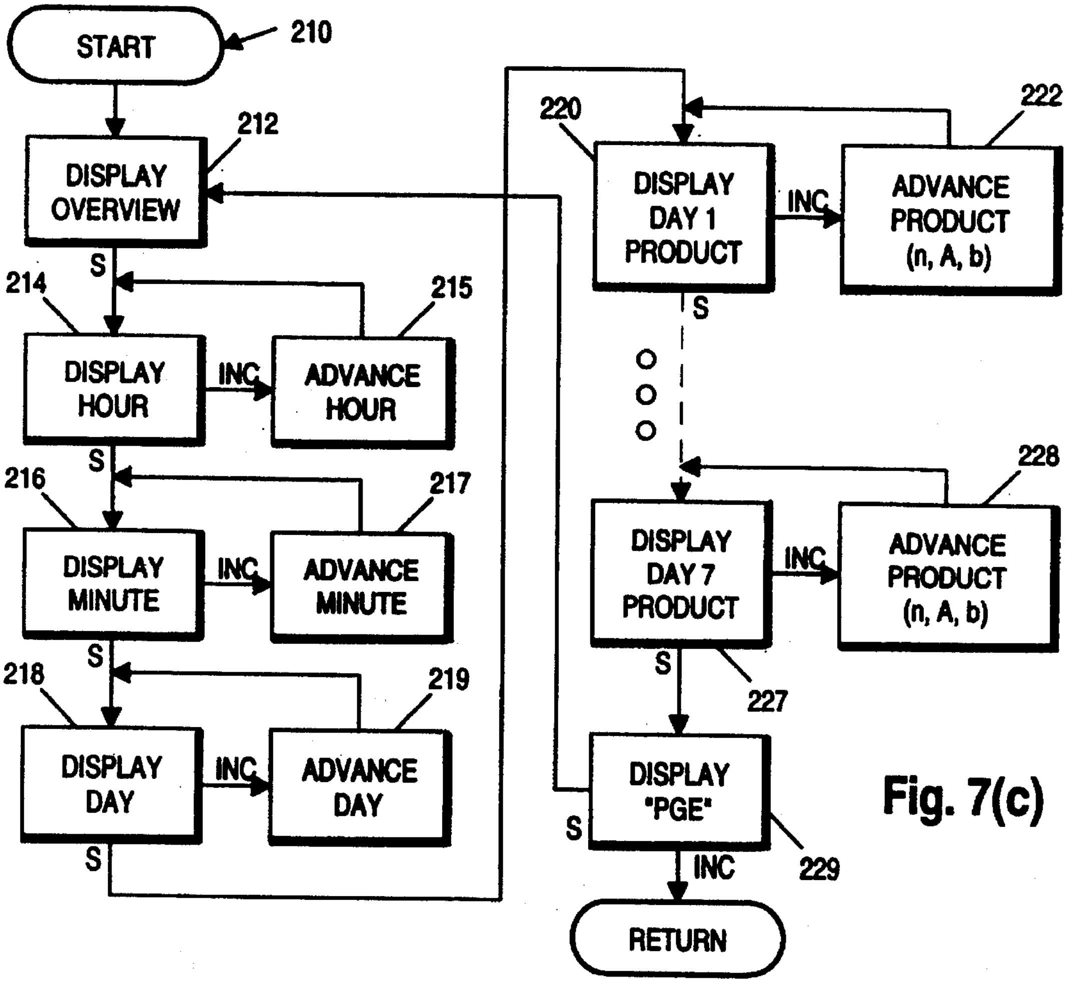
Figure 7D:
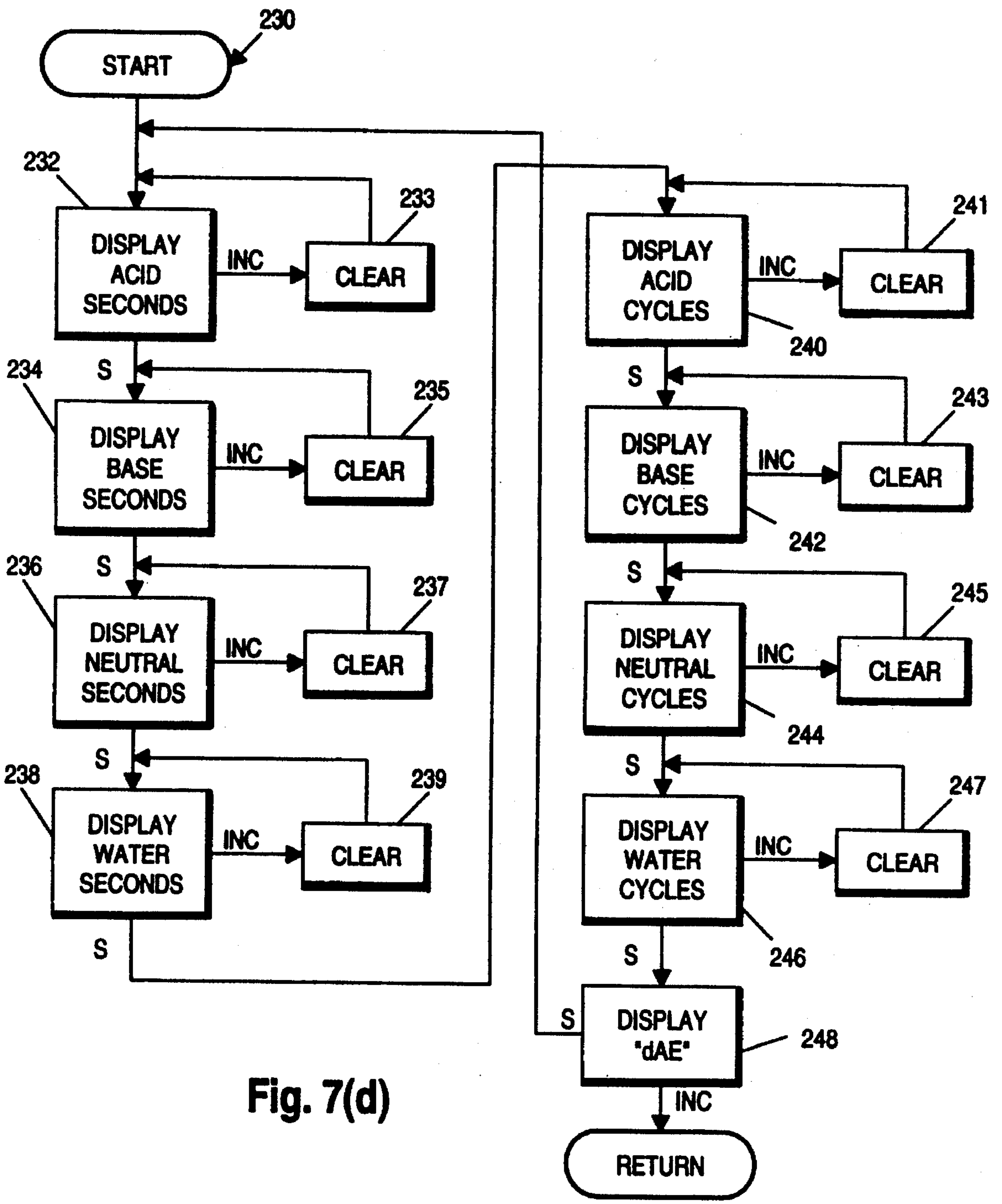

FIG. 6 shows a schematic representation of the control system 110 for dispensing system 100. A CPU 122 (e.g., a microprocessor or microcontroller) is used to control the operation of use solution dispensers 10*a*, 10*b* and 10*c* and fresh water dispenser 106 through the activation/de-activation of solenoid valves 14*a,* 14*b* and 14*c* for dispensers 10*a,* 10*b* and 10*c,* respectively, and solenoid valve 107 for fresh water dispenser 106. Relays 103*a,* 103*b,* 103*c* and 103*d* are used to drive the solenoids with logic level (5 VDC) control signals from CPU 122.

Pressure switches 102*a,* 102*b,* 102*c* and 108 are located downstream of their respective solenoid valves for providing signals to indicate to CPU 122 when flow has been established through their respective dispenser. The pressure switches are preferably on/off type switches which switch on at a pressure of greater than about 4 psi, such as the Model 76583 manufactured by Hobbs Inc. Consequently, CPU 122 can determine via these switches whether a solenoid valve is working properly, and also, whether a valve needs to be opened or closed consistent with the current status of the system. Other manners of detecting flow, such as flowmeters or other pressure sensors, may also be used.

CPU 122 also receives inputs from capsule present sensors 104*a,* 104*b* and 104*c* in dispensers 10*a,* 10*b* and 10*c,* respectively. The capsule present sensors are contact type sensors, such as the Model 59210-020 manufactured by Hamlin Inc., which are configured to detect via gravitational force that solid cast block compositions are mounted properly within their respective dispensers. CPU 122 can thus prevent the opening of a solenoid valve when a solid product is not properly installed.

CPU 122 also receives as inputs three push button switches 130, 132 and 134 (also shown in FIG. 1) which are preferably normally open momentary contact push button switches. Switch 130 is labeled a "back room switch" which an operator presses to receive the proper dispensed solution according to the preset cleaning schedule (since a cleaning schedule is typically used for the back room or kitchen area of an establishment). Switch 132 is labeled a "front room switch" which an operator presses to receive the neutral cleaning solution from dispenser 10*b* (since a non-caustic neutral solution is typically used in the customer or front room areas of an establishment). Switch 134 is labeled a "fresh water" switch for dispensing fresh water from dispenser 106. Switches 130, 132 and 134 are also used in an operator mode to perform several high level programming and data acquisition functions.

CPU 122 displays information via displays 140 (also shown in FIG. 1), which preferably include a seven-segment LED display 141 and LED indicators 142 which indicate when base solution, neutral solution, acid solution or fresh water is being dispensed.

Other switches, keys, and displays may be used consistent with the invention, including more elaborate keyboards and displays or monitors. In addition, different data storage devices, printers, etc. may also be included.

CPU 122 is preferably a microprocessor or microcontroller such as a Model 80C51 manufactured by Intel. Suitable ROM and RAM circuits (not shown) may be included to provide program storage and workspace, or may be incorporated on-board CPU 122. Configuration data, current time and day, and usage data is preferably maintained in a Battery Backed RAM/Real Time Clock circuit 124, such as a DS1202 circuit manufactured by Dallas Semiconductor. Program options for CPU 122 are provided by DIP switches 136. Power is provided by a power source 138 such as a battery or 120 VAC or 220 VAC line power, using appropriate power supply support circuitry. A Watchdog/Power Monitor 135, such as a D1232 manufactured by Dallas Semiconductor, may be used to re-initialize the system should it ever lock up or experience a power loss.

The pin connections and circuit wiring necessary to implement control system 110 are within the skill of the ordinary artisan. In addition, it will be appreciated that other support circuitry, such as a processing clock, and various data buffers, drivers, jumpers, etc., may also be required.

FIGS. 7(*a*)–7(*d*) show a preferred program flow for operating dispensing system 100. The operating instructions for implementing the preferred program flow are within the skill of an ordinary artisan. As shown in FIG. 7(*a*), a main routine 170 repeatedly checks in block 172 to see if a key (130, 132 or 134 in FIG. 6) is pressed by an operator. If no key is pressed, control passes to block 196 to check if any of the pressure switches 102*a,* 102*b,* 102*c* or 108 are activated, indicating that flow is established through a respective dispenser. If no flow is detected, the main routine returns to block 172 to check for a key depression. If flow is detected, control passes to block 198 to shut off the appropriate valve (since no key was depressed and no solution was requested by an operator) before returning to block 172.

A key depression may be detected by various known manners. For example, block 172 may continuously monitor the status of each switch. Alternatively, switches 130, 132 and 134 may be used to trigger an external interrupt, whereby control system 110 may be maintained in a sleep mode to conserve battery power during periods of non-use, then awakened by depression of a key.

If switch 130 (back room) was depressed, control passes to block 174 to dispense the appropriate use solution for the current day based upon the preset cleaning schedule programmed into control system 110. First, block 174 checks the status the appropriate capsule present switch (switches 104*a,* 104*b* or 104*c*) and determines if the appropriate solid block capsule is properly installed. If the capsule is not detected, control passes to block 175 to handle the error condition (e.g., by signaling an error on the display and preventing the dispenser from being activated).

If a capsule is detected, control passes to block 176 to open (activate) the appropriate solenoid valve 14*a,* 14*b* or 14*c*. Then, in blocks 173 and 179, the program repetitively checks if switch 130 was depressed a second time, or if a sufficient period of time has elapsed since the solenoid valve was opened, before closing (deactivating) the appropriate solenoid valve in block 180. After the solenoid valve is closed, control returns to block 172 to enable an operator to initiate another cycle.

Block 178 preferably checks if a second depression of key 130 has occurred. Consequently, an operator pushes switch 130 once to start the dispensing cycle, and another time to end the cycle, whereby switch 130 acts as a push-on, push-off type switch. Alternatively, block 178 could check if key 130 has been released, whereby the key would act as a momentary switch, and an operator would need to hold down the switch throughout the dispensing cycle.

Block 179 limits the amount of time in which the appropriate dispenser is activated. This reduces the chance of the dispenser overflowing a mop bucket or other container when unattended. It also operates as an auto-fill function, whereby a predetermined quantity of use solution may be dispensed for each depression of switch 130. The preset time limit in block 179 is preferably set via DIP switches 136. Alternatively, the time period may be controlled via separate switches, or in the programming mode of control system 110.

If, in block 172, switch 132 is detected, neutral use solution dispenser 10*b* is activated in blocks 182–188. In block 182, capsule present switch 104*b* is checked, whereby control passes to block 175 to process an error if no capsule is detected. In block 184, neutral solenoid valve 14*b* is activated. Blocks 186 and 187 detect whether another key has been pressed, or if the preset time period has expired, before deactivating solenoid valve 14*b* in block 188 and returning control to block 172. This enables an operator to dispense an all-purpose cleaning solution for performing different cleaning tasks outside of the preferred cleaning schedule.

If, in block 172, switch 134 is detected, fresh water dispenser 106 is activated in blocks 190–194 to dispense fresh water. In block 190, fresh water solenoid valve 107 is activated. In blocks 192 and 193, a second key depression is detected, or a sufficient time elapses, before valve 107 is deactivated in block 194 and control returns to block 172. Blocks 192 and 193 may operate in any manner described above for blocks 178–179 or 186–187. Thus, an operator may dispense fresh water from the dispenser as desired.

The routines for handling switches 130, 132 and 134 may also perform data logging for the purposes of monitoring the use of dispensing system 100. For example, each routine may monitor and store the number of activations of the dispensers, as well as accumulate the total amount of time, or the total quantity of solutions, that are dispensed by each dispenser. Furthermore, each routine may also check pressure switches 102*a*, 102*b*, 102*c* and 108 to monitor whether flow is established in the respective dispensers after the solenoid valves are opened. Consequently, the failure of a solenoid valve may be detected in this manner.

An operator may also enter an operator mode 200 by inputting a specified operator code using switches 130, 132 and 134. For instance, the operator code may be the depression of all three keys simultaneously, or by depressing the keys in a specified order. It will be appreciated that key pressed block 172 will be configured to detect the proper sequence of keys to sense an operator code condition. Alternatively, a separate switch, e.g., one located within housing 150 to limit access thereto, may also be used to enter operator mode routine 200.

The operator mode 200 is shown in FIG. 7(*b*). In this restricted-access mode, various configuration, programming and data acquisition functions may be accessed by authorized personnel.

First, in blocks 202, 204 and 206, an operator is able to toggle between a program mode, a data acquisition mode and an exit mode by successively depressing an "S" key (which is switch 130, the back room key, in the preferred embodiment). Block 202 queries an operator to enter a program mode, preferably by displaying the characters "P" and "G" repeatedly and successively on display 141. An operator is able to access the program mode (routine 210) by depressing an "INC" key (which is switch 132, the front room key, in the preferred embodiment). Similarly, block 204 prompts an operator to enter data acquisition mode (routine 230) by displaying the characters "d" and "A" on display 141, and block 206 prompts a user to exit operator mode by displaying the characters "O", "F" and "F" on display 141.

FIG. 7(*c*) shows program mode routine 210. In block 212, all of the current programmed data is preferably continuously cycled through on display 141. By depressing the "S" switch (preferably switch 130) one or more times, different preset values may be displayed and modified. For example, in block 214, the current hour is displayed, and may be advanced by depressing the "INC" key (preferably switch 132) the appropriate number of times to increment the hours variable in block 215. Similarly, in blocks 216 and 217, the current minute may be displayed and adjusted. In blocks 218 and 219, the current day (e.g., where Sunday is "1" and Saturday is "7") is displayed and adjusted.

In blocks 220 and 222, the preferred use solution to dispense on day 1 may be displayed and adjusted. For example, successive depressions of the "INC" key would toggle the preferred use solution between neutral ("n"), acid ("A") and base ("b"). Similar routines are used for days 2–7 (wherein only the day 7 routine is shown in FIG. 7(*c*) as blocks 227 and 228). Then, if all of the program data is acceptable to an operator, the operator may exit program mode at block 229 by depressing the "INC" key.

FIG. 7(*d*) shows data acquisition mode routine 230, where historical data may be displayed and cleared by an operator. Block 232 displays the total number of seconds of dispensing for acid solution dispenser 10*c*, and block 240 shows the total number of times (cycles) dispenser 10*c* has been activated. Blocks 234 and 242 display the total number of seconds and the total number of activation cycles, respectively, for base dispenser 10*a*. Blocks 236 and 244 display the total number of seconds and the total number of activation cycles, respectively, for neutral dispenser 10*b*. Blocks 238 and 246 display the total number of seconds and the total number of activation cycles, respectively, for fresh water dispenser 106. The different displays are selected by depressing the "S" key. Moreover, each value may be cleared (e.g., in blocks 233, 235, 237, 239, 241, 243, 245 or 247) by depressing the "INC" key when the desired value is being displayed. Data acquisition mode 230 may be exited by depressing the "INC" key when the characters "d", "A" and "E" are displayed by block 248.

By virtue of the preferred dispensing system 100, a preferred cleaning schedule or regimen may be maintained automatically, and without any additional input from an operator. Consequently, operator error is minimized since the operator does not have to remember where in a cycle they are, which use solution goes with which day in a particular schedule, etc. Furthermore, cleaning is optimized as a result of following the preferred schedule.

In addition, safety to operators is also improved in certain applications. By following an optimal cleaning regimen, the amount of acid or base solutions necessary in a particular regimen may be reduced in some applications, thus reducing the exposure of operators to acidic and alkaline chemicals.

It will be appreciated that the preferred dispensing system 100 may be used in applications other than cleaning floors, e.g., in any application where multiple use solutions (cleaning or non-cleaning) are used according to a predetermined schedule. Moreover, the schedule may vary depending upon month, week, day, hour, etc., or may vary on a non-time related element, such as different dispensing cycles or different cycles by a certain user, etc. It will further be appreciated that multiple product dispensing systems consistent with the invention may use different dispensers than those disclosed herein, e.g., dispensers using non-solid chemical products such as dispensers for liquid concentrates.

Although the present invention has been described with reference to the foregoing specification, examples and data, they should not be used to unduly limit the scope of the invention or the claims. Those skilled in the art may make many other modifications without departing from the spirit and scope of the invention as defined by the appended claims.

What is claimed is:

1. A dispenser for dispensing a use solution comprising a solid chemical composition and a diluent, the dispenser comprising:

(a) a manifold having an inlet port and first and second outlet ports, the inlet port for receiving a flow of diluent;

(b) mixing means, in fluid communication with the first outlet port of the manifold, for mixing the diluent with a solid chemical composition to form a liquid concentrate, the mixing means including a first flow restrictor for restricting the flow of diluent through the first outlet port, and a first outlet tube for dispensing the liquid concentrate;

(c) diluting means, in fluid communication with the second outlet port of the manifold, for diluting the liquid concentrate with diluent to form a use solution, the diluting means including a second flow restrictor for restricting the flow of diluent through the second outlet port, and a second outlet tube in fluid communication with the second outlet port and disposed within the first outlet tube; whereby the concentration of the use solution is related to the respective flow rates through the first and second outlet ports; and (d) foam reducing means, coupled to the second outlet tube, for decreasing the kinetic energy of the diluent from the second outlet port prior to diluting the liquid concentrate.

2. The dispenser of claim 1, wherein the first flow restrictor comprises a spray nozzle.

3. The dispenser of claim 2, further comprising an enclosure, and wherein the manifold is fully disposed within the enclosure.

4. The dispenser of claim 1, wherein the foam reducing means includes a plurality of flexible members disposed at the end of the second outlet tube.

5. The dispenser of claim 4, wherein the plurality of flexible members are defined by longitudinal slits formed in the end of the second outlet tube.

6. The dispenser of claim 1, wherein the second flow restrictor includes a metering orifice removably connected to the manifold.

7. The dispenser of claim 6, wherein the metering orifice is one of a plurality of differently sized metering orifices.

8. The dispenser of claim 1, further comprising a valve, in fluid communication with the inlet port of the manifold, for controlling the flow of diluent into the manifold.

9. The dispenser of claim 8, wherein the mixing means and the diluting means are directly connected to the first and second outlet ports of the manifold; whereby the dispenser delivers the use solution solely through the operation of the valve.

10. A method of dispensing a use solution comprising a solid chemical composition and a diluent, the method including the steps of:

(a) directing a flow of diluent to first and second outlet ports of a manifold;

(b) mixing the diluent from the first outlet port with a solid chemical composition to form a liquid concentrate;

(c) decreasing the kinetic energy of the diluent from the second outlet port using a foam reducer;

(d) diluting the liquid concentrate with diluent from the second outlet port to form a use solution, wherein the liquid concentrate is diluted while disposed within a first outlet tube by directing a stream of diluent onto the liquid concentrate, and wherein the diluent is from a second outlet tube which is disposed within the first outlet tube; and (e) regulating the respective flow rates through the first and second outlet ports to control the concentration of the use solution.

11. The method of claim 10, wherein the foam reducer includes a plurality of flexible members disposed at the end of the second outlet tube.

12. The method of claim 11, wherein the plurality of flexible members are defined by longitudinal slits formed in the end of the second outlet tube.

13. The method of claim 10, wherein the regulating step comprises the step of providing a metering orifice in fluid communication with the second outlet port to restrict the flow of diluent through the second outlet port.

14. The method of claim 13, wherein the metering orifice ms removably connected to the second outlet port, the method further comprising the step of selecting the metering orifice from a plurality of differently sized metering orifices; whereby the plurality of metering orifices provide different respective flow rates through the first and second outlet ports.

15. The method of claim 13, wherein the mixing step includes the step of directing a pressurized stream of diluent through a spray nozzle onto a cast solid block of chemical composition; whereby the spray nozzle restricts the flow of diluent through the first outlet port.

16. The method of claim 10, further comprising the step of controlling the dispensing of use solution solely by controlling the flow of diluent to the manifold with a single valve.

17. A dispenser for dispensing a use solution comprising a solid chemical composition and a diluent, the dispenser comprising:

(a) a manifold having an inlet port and first and second outlet ports, the inlet port for receiving a flow of diluent;

(b) mixing means, in fluid communication with the first outlet port of the manifold, for mixing the diluent with a solid chemical composition to form a liquid concentrate, the mixing means including a first flow restrictor for restricting the flow of diluent through the first outlet port, and a first outlet tube for dispensing the liquid concentrate; and (c) diluting means, in fluid communication with the second outlet port of the manifold, for diluting the liquid concentrate with diluent to form a use solution, the diluting means including a second flow restrictor for restricting the flow of diluent through the second outlet port, and a second outlet tube in fluid communication with the second outlet port and disposed within the first outlet tube; whereby the concentration of the use solution is related to the respective flow rates through the first and second outlet ports.

18. The dispenser of claim 17, further comprising foam reducing means, coupled to the second outlet tube, for decreasing the kinetic energy of the diluent from the second outlet port prior to diluting the liquid concentrate.

19. The dispenser of claim 18, wherein the foam reducing means includes a plurality of flexible members disposed at the end of the second outlet tube, wherein the plurality of flexible members are defined by longitudinal slits formed in the end of the second outlet tube.

20. The dispenser of claim 17, wherein the first flow restrictor comprises a spray nozzle, and wherein the second flow restrictor includes a metering orifice removably connected to the manifold.

21. The dispenser of claim 17, further comprising an enclosure, and wherein the manifold is fully disposed within the enclosure.

22. The dispenser of claim 17, further comprising a valve, in fluid communication with the inlet port of the manifold, for controlling the flow of diluent into the manifold.

23. The dispenser of claim 22, wherein the mixing means and the diluting means are directly connected to the first and second outlet ports of the manifold; whereby the dispenser delivers the use solution solely through the operation of the valve.

* * * * *